Figures 1, 2:
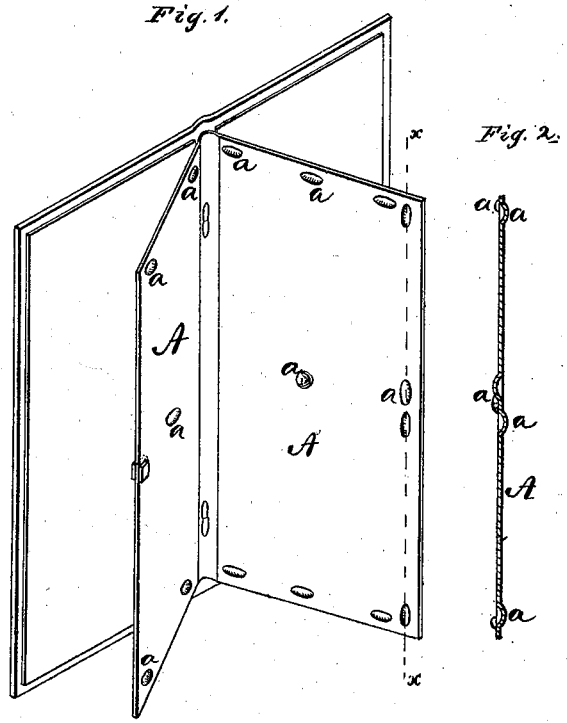

C. N. BROWN.
Erasive Tablets.

No. 147,597.

Patented Feb. 17, 1874.

WITNESSES.

INVENTOR

Henry N. Miller

Charles N. Brown

C. L. Everton

Alexander Mato

By

Attorneys.

UNITED STATES PATENT OFFICE.

CHARLES N. BROWN, OF PROVIDENCE, RHODE ISLAND.

IMPROVEMENT IN ERASIVE TABLETS.

Specification forming part of Letters Patent No. 147,597, dated February 17, 1874; application filed January 23, 1874.

*To all whom it may concern:*

Be it known that I, C. N. BROWN, of Providence, in the county of Providence and in the State of Rhode Island, have invented certain new and useful Improvements in Erasive Tablets and Silicate Slate; and do hereby declare that the following is a full, clear, and exact description thereof, reference being had to the accompanying drawings, and to the letters of reference marked thereon, making a part of this specification.

My present invention is intended as an improvement upon the writing-tablet for which Letters Patent No. 144,950 were granted to me November 25, 1873. In this patent I claimed ribs raised on or attached to the leaves of an erasive tablet; but I find, by experiment, that small projections formed on or attached to the leaves of the tablet will answer the same purpose as the ribs extending entirely across the leaf, and that such projections may be formed on or attached to silicate slate, as well as to the ordinary erasive tablet. The nature of my invention, therefore, consists in a silicate slate or erasive tablet provided with projections attached to or formed in the leaves thereof, for the purpose of preventing the rubbing together of the writing-surfaces and consequent blurring of the writing, as will be hereinafter more fully set forth.

In the accompanying drawing, Figure 1 is a perspective view of a silicate slate or erasive tablet embodying my invention, and Fig. 2 is a section through the line $x\ x$ of one of the leaves.

A A represent the leaves of a silicate slate or erasive tablet. Each leaf A is provided with a suitable number of small projections, $a\ a$, which, when the leaves are closed, will prevent the writing-surfaces from rubbing together and obliterating or blurring the writing. These projections may be raised upon one side of the leaf by impressing or indenting the other side by means of dies fitted for the purpose; or they may be formed in or of the material of which the leaves are made; or the projections may be made separate, of wood, metal, or any other suitable material, and attached in any convenient manner to the leaves; or drops of glue or wax prepared for the purpose may be deposited on the leaves, and answer the same object.

Having thus fully described my invention, what I claim as new, and desire to secure by Letters Patent, is—

An erasive or silicate-slate tablet provided with projections $a\ a$, attached to or formed in the leaves thereof, substantially as and for the purposes herein set forth.

In testimony that I claim the foregoing, I have hereunto set my hand this 30th day of December, 1873.

CHARLES N. BROWN.

Witnesses:
ALFRED RICKARD,
WILLIAM W. RICKARD.